US008903551B2

(12) United States Patent
El-Essawy et al.

(10) Patent No.: US 8,903,551 B2
(45) Date of Patent: Dec. 2, 2014

(54) SENSOR-SWARM ENVIRONMENTAL EVENT DETECTION (75) Inventors: Wael El-Essawy, Austin, TX (US); Heather L. Hanson, Austin, TX (US); Thomas W. Keller, Jr., Austin, TX (US); Juan C. Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 13/215,386

(22) Filed: Aug. 23, 2011

(65) Prior Publication Data
US 2013/0054032 A1 Feb. 28, 2013

(51) Int. Cl.
*G05B 13/00* (2006.01)
*G01D 21/00* (2006.01)

(52) U.S. Cl.
CPC ................................. *G01D 21/00* (2013.01)
USPC ........................... 700/275; 700/291; 705/308

(58) Field of Classification Search
CPC ...................................................... G05B 23/00
USPC .................................. 700/275, 291; 705/308
See application file for complete search history.

(56) References Cited

U.S. PATENT DOCUMENTS

| 6,502,787 | B1 | 1/2003 | Barrett |
| 6,687,571 | B1 | 2/2004 | Byrne et al. |
| 6,712,312 | B1 | 3/2004 | Kucik |
| 6,842,674 | B2 | 1/2005 | Solomon |
| 6,868,314 | B1 | 3/2005 | Frink |
| 7,302,316 | B2 | 11/2007 | Beard et al. |
| 7,366,632 | B2 | 4/2008 | Hamann et al. |
| 7,644,051 | B1 * | 1/2010 | Moore et al. ................... 706/21 |
| 7,675,410 | B2 | 3/2010 | Aritsuka et al. |
| 7,733,416 | B2 | 6/2010 | Gal |
| 7,739,073 | B2 | 6/2010 | Hamann et al. |
| 7,756,667 | B2 * | 7/2010 | Hamann et al. ............... 702/130 |
| 2004/0030448 | A1 | 2/2004 | Solomon |
| 2004/0068351 | A1 | 4/2004 | Solomon |
| 2006/0180676 | A1 | 8/2006 | Park et al. |
| 2006/0184292 | A1 | 8/2006 | Appleby et al. |
| 2006/0242285 | A1 | 10/2006 | Moriwaki |
| 2008/0320087 | A1 | 12/2008 | Horvitz et al. |

(Continued)

OTHER PUBLICATIONS

Fronczek, Joseph W. and Prasad, Nadipuram R., "Bio-inspired sensor swarms to detect leaks in pressurized systems", Conference Proceedings—IEEE International Conference on Systems, Man and Cybernetics, v 2, p. 1967-1972, 2005.

(Continued)

*Primary Examiner* — Mohammad Ali
*Assistant Examiner* — Anthony Whittington
(74) *Attorney, Agent, or Firm* — Mitch Harris, Atty at Law, LLC; Andrew M. Harris; William J. Stock (57) ABSTRACT

Data center environmental sensing is provided by a measurement system that detects environmental events from inputs received from a plurality of movable sensors. The sensors are moved in response to detection of an event to a region of the data center associated with the event, providing increased spatial resolution of the measurement in the region of the event. Events such as leakage between hot and cold aisles of a data center can be detected by the system, which may use one or more movable devices that can be moved around, between and over equipment, to carry multiple sensors toward the source of the event, providing both diagnostic and detailed environmental information.

19 Claims, 5 Drawing Sheets

(56) References Cited

U.S. PATENT DOCUMENTS

2010/0198736 A1* 8/2010 Marino .................. 705/308
2010/0292568 A1* 11/2010 Droitcour et al. ............. 600/425
2011/0307112 A1* 12/2011 Barrilleaux ................ 700/291

OTHER PUBLICATIONS

White, B.A., "Contaminant cloud boundary monitoring using UAV sensor swarms", Collection of Technical Papers—AIAA Guidance, Navigation, and Control Conference 2007, v 4, p. 4014-4035, 2007.

Jatmiko, W., "A PSO-based mobile sensor network for odor source localization in dynamic environment: theory, simulation and measurement", 2006 IEEE Congress on Evolutionary Computation, 1021-8, 2007, Vancouver, BC, Canada.

Edmond Wong, "Towards Autonomous Inspection of Space Systems Using Mobile Robotic Sensor Platforms", Space 2006, sponsored by the American Institute of Aeronautics and Astronautics, San Jose, California, Sep. 19-21, 2006.

"A Positioning System that Goes Where GPS Can't", Scientific American, Jan. 2008, Downloaded from Internet at http://www.scientificamerican.com/article.cfm?id=indoor-positioning-system on Aug. 10, 2011.

* cited by examiner

Fig. 5

SENSOR-SWARM ENVIRONMENTAL EVENT DETECTION

BACKGROUND OF THE INVENTION

1. Field of the Invention

The present invention is related to data center environmental management, and more specifically to a system and method for detecting environmental events within the data center.

2. Description of Related Art

With the increased concentration of computing resources such as web servers and cloud computing facilities, data centers are becoming larger and more sophisticated in environmental and energy management. Since thermal management, or lack thereof, has a direct bearing on failure rates of devices, there are direct cost penalties and benefits associated with designing maintaining proper conditions within a data center.

Further, there are environmental conditions other than thermal conditions that can create hostile environments for operators and equipment, such as high or low air pressure conditions, out-of-range humidity levels, and presence of gases due to either equipment failures, e.g., combustion of components within a server rack, or unexpected introduction of substances into the data center.

Therefore, it would be desirable to provide an efficient and economical system and method for both detecting and obtaining detailed and localized information about environmental events in a data center.

BRIEF SUMMARY OF THE INVENTION

The invention is embodied in a method, system and data center, in which the data center is monitored for an environmental event by multiple sensors that sense an environmental parameter, such as temperature, air pressure, or air quality.

The system and method measure the environmental parameter with a plurality of movable sensors and provide sensor outputs to a measurement system that determines whether an environmental event has occurred and a controller that, in response to the measurement system detecting the event, moves the multiple movable sensors to increase a spatial resolution of the measurements near the event.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses methods and systems for environmental monitoring in a data center, in which movable sensors are employed to reduce the quantity of sensors needed to perform high resolution measurements. In response to detection of an environmental event, movable sensors are guided toward a direction of the event so that additional measurements can be taken to increase the spatial resolution of the environmental data related to the event. One or more movable sensors may be integrated in a device that moves within the data center. Communications between the sensors and a monitoring system may be wired or wireless.

Figure 1:
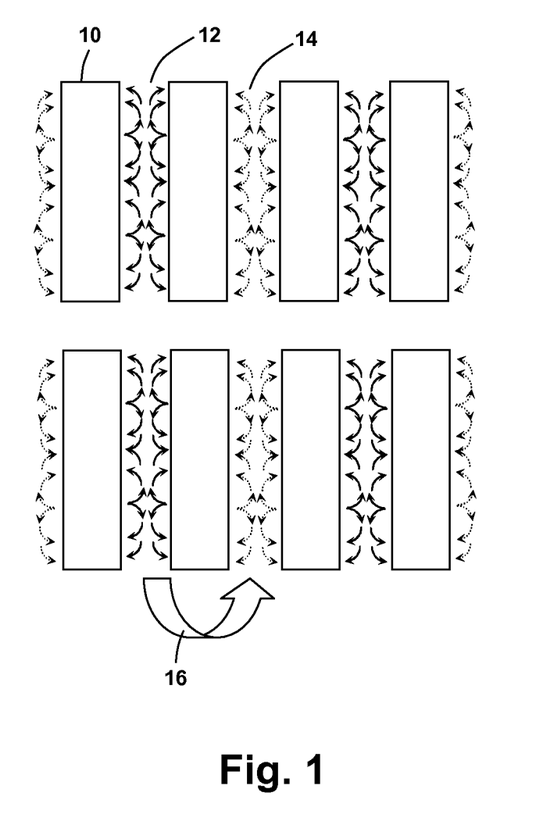
FIG. 1 is a pictorial diagram illustrating airflow in a datacenter in which an environmental monitoring according to an embodiment of the present invention may be practiced.

Referring now to FIG. 1, a top view of a data center is illustrated in which techniques in accordance with an embodiment of the present invention may be practiced. An array of rack cabinets 10 is aligned in rows and columns, with aisles 12, 14 extending between the rack cabinets 10 in both horizontal directions. Rack cabinets 10 generally contain server equipment, including processing subsystem racks and/or other types of computing resources such as magnetic storage device arrays. Rack cabinets 10 also include ventilation and cooling equipment that remove generated heat from rack cabinets 10 and the data center also includes heating ventilation and air conditioning (HVAC) equipment that removes heat generated by equipment within rack cabinets 10 to maintain proper operating conditions for the equipment and to provide an environment that can accommodate entry by operators and service personnel. For efficiency and to provide the linkage between building HVAC equipment and the air flow exhausting heat from rack cabinets 10, the back sides of rack cabinets are aligned with "hot aisles" 12 and the control side of rack cabinets, i.e., the side of rack cabinets in which the front panels of installed server equipment is generally placed, are organized in "cold aisles." The temperature of hot aisles 12 may be, for example 20° C. hotter than the cold aisles 14, which, for facilities in which human operators enter, are generally maintained at approximately 20-25° C. to meet environmental conditions specified for the equipment installed in rack cabinets 10. For example, a self-ventilated rack-mounted server chassis may require inlet air to be maintained at 25° C. or below. For facilities that are closed, i.e., for which no human entry is expected, temperatures may fall outside of a comfortable range, for example, the cold aisles may be super-cooled in order to improve heat removal from equipment.

FIG. 1 illustrates one type of event that the system and method of the present invention are capable of discovering and evaluating: a leak 16 between hot and cold aisles of the data center. Such a leak could be a flaw in a facility design, could occur due to an equipment change (e.g., equipment removed without replacing panels), equipment failure (e.g., fans stopped running in a chassis), or another cause such as a door that is supposed to be maintained in a closed condition has been left open. In order to discover the thermal leak, temperature sensors are deployed within the data center. In the present invention, movable sensors are additionally employed and may be moved in response to detection of an event so that measurements having higher spatial resolution can be used in the vicinity of the event in order to evaluate the event more thoroughly. The additional information gathered can be used to more accurately pinpoint the location of the event, the location of the source of the event, to determine a severity of the event, determine a type of event, and for other purposes for which higher resolution data gathering is useful. To accomplish such operation through only fixed sensors would require a large number of sensors, some of which may be inconvenient to place while maintaining aisles free of obstructions. By employing movable sensors, a device containing the sensors can be stowed in an unobtrusive location, if needed, and then only brought into the spaces used by operators and service personnel, e.g., the cold aisles, when the data center is not being accessed by personnel. The system may also periodically monitor certain areas at higher resolution, or periodically apply uniform scanning until an event is detected, in order to measure certain areas or areas associated with detected events at a higher resolution.

Figure 2:
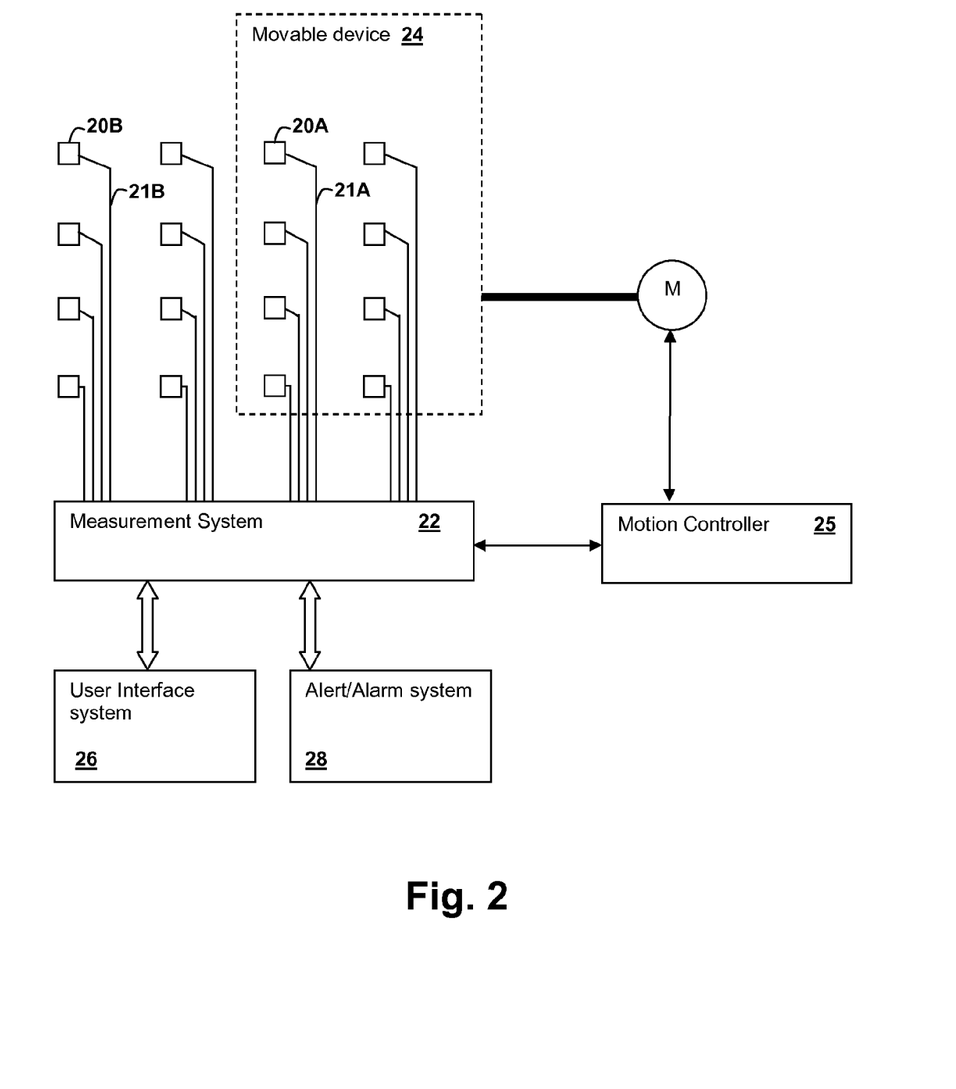
FIG. 2 is a block diagram illustrating a system in accordance with an embodiment of the present invention.

Referring now to FIG. 2, a system in accordance with an embodiment of the present invention is shown. The system includes a plurality of fixed location sensors 20B, which may be sensors affixed to rack cabinets 10 of FIG. 1, may be located at other fixed positions within the data center building, or within data center containers and/or which may be sensors integrated within equipment mounted in rack cabinets 10, or other locations such as within rack, room or building air handlers, such as HVAC inlet/outlets. Fixed location sensors 20B are connected to a measurement system 22 via wired or wireless connections 21B. The system of FIG. 2 also includes a movable device 24, which may alternatively be multiple movable devices, to which a plurality of movable sensors 20A is affixed. Movable sensors 20A are connected to a measurement system 22 via wired or wireless connections 21A. A motor M or other form of positioning mechanism is coupled to movable device 24, or integrated within movable device in self-propelled implementations. A motion controller 25 provides control of motor M, and receives input from measurement system 22, which can be controlled by user interface 26, or automatically by the system. Motion controller 25 directs movable sensors 20A along trajectories as directed by measurement system 22, which can include pre-programmed trajectories, or trajectories calculated from measurements, and/or by trajectories programmed by or controlled directly by user interface 26. Trajectories may be re-programmed dynamically to address the needs of datacenter operations, such as circulating through the facility on a periodic basis until measurement system 22 determines that an environmental event has occurred within the data center, in response to which motor M is activated to move movable device 24 toward a region associated with the event. A user interface system 26, which may be a remote computer system coupled via a network to measurement system 22, provides for reporting and logging of environmental information, including the results of environmental measurements made using sensors 20A, 20B, and control of operating parameters of measurement system 22. An alert/alarm system 28 provides for notification of systems personnel via various channels such as Internet email and other messaging, voice or data telephone messaging, visual alarm indicators provided on measurement system 22, movable sensors 20A or via user interface 26, an alarm system, or via a remote interface, such as a web interface coupled to measurement system 22, so that anomalous events detected by measurement system can be reported immediately to systems personnel if the severity indicates that immediate action should be taken to respond to the event. Event/alarm system 28 can also interface to other systems facilities to automatically respond to an event. For example, if thermal measurements, or air quality measurements indicate that a fire is occurring, sprinklers can be activated and power can be removed from the system, as well as activation of external alarm systems that alert occupants of the building housing the data center to evacuate. Notification of emergency services may also be tied into alert/alarm system 28.

Figure 3:
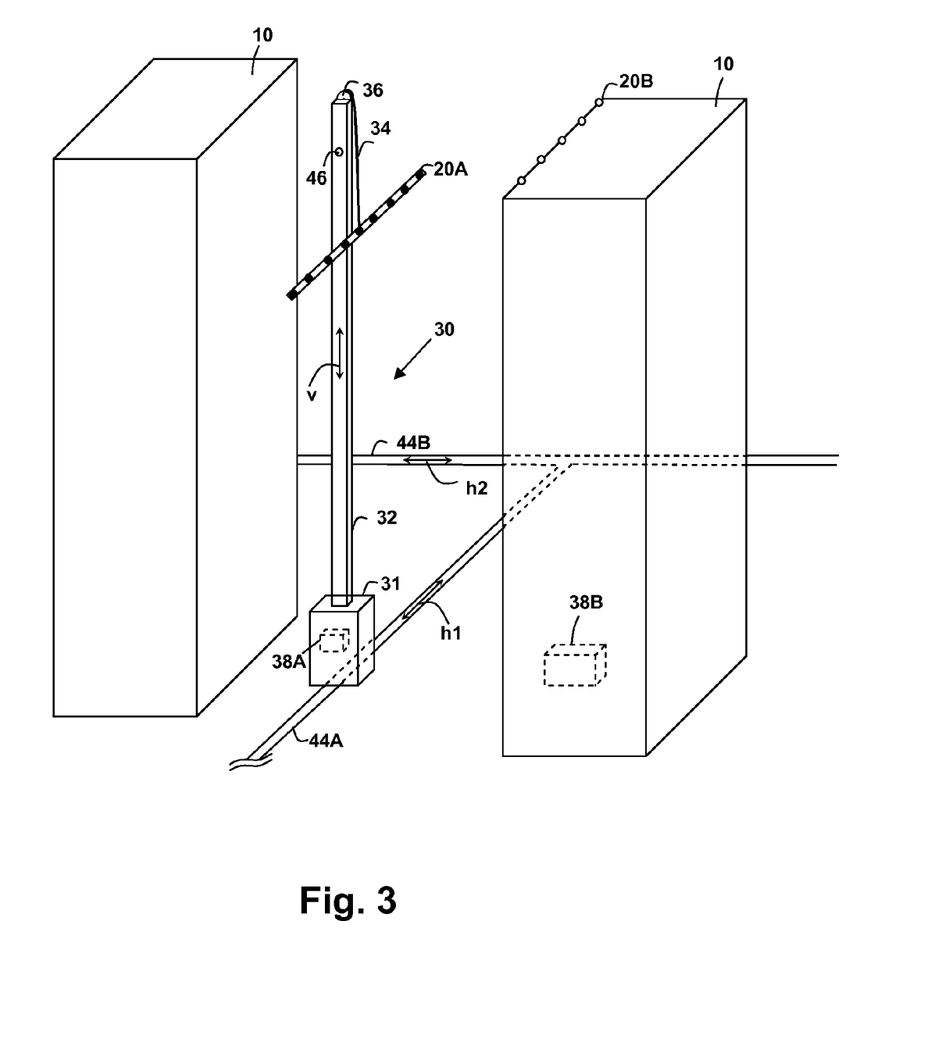
FIG. 3 is a pictorial diagram showing details of a system in accordance with an embodiment of the present invention.

Referring now to FIG. 3, a system in accordance with an embodiment of the present invention is shown. The system depicted in FIG. 3 includes a movable device 30 having a base 31 and a vertical extension 32 rising from base 30. In the depicted embodiment, movable sensors 20A are disposed along a single horizontal dimension h1 and mounted on a movable boom 40, and boom 40 is slideably coupled to vertical extension 32 and coupled to a motor within base 30 by a cable 34 and pulley 36 to move boom 40 along a vertical axis v. The resulting operation provides a movable device 30 that can scan the top, front or back of a rack cabinets 10 to gather environmental data. Movable device 30 moves in horizontal dimension h1 in the aisles of the data center along tracks 44A and can also move across aisles in another horizontal dimension h2 along tracks 44B. Therefore, movable sensors 20A are not independently movable in the embodiment depicted in FIG. 3, but their entire reference frame moves together due to the structure of movable device 30. Alternatively, each movable device in an alternative embodiment of the invention may include a lesser number of sensors, e.g., a single sensor, and may be moved independently of other movable devices, providing a unitary movable sensor 20A that has a location independent of other sensors. In the depicted embodiment, movable device 30 is disposed between rack cabinets 10 and moves along an aisle. Movable device 30 can be operated to periodically move along the aisles of a data center and may be guided in a tracks 44A, 44B, from which electrical power can be provided to the electronics 38A within movable device 30, which may include measurement system 22 and motor controller 24 as shown in FIG. 2. Communications can be made wirelessly from movable device 30 to another device such as a processing subsystem 38B within one of rack cabinets 10 that handles event reporting and alerts/alarms. Alternatively, electronics 38A may include only the sensor interfaces and wireless or wired communications link and external processing subsystem 38B may provide all of the measurement analysis, event reporting and motor control. The motor may be mounted on movable device 30, e.g., as part of electronics 38A or motive force may be provided external to movable device 30, e.g., by cables or other mechanical linkages that pull or push movable device 30 down the aisle.

The position of movable device 30 may be determined by internal position sensing, e.g., by an encoder linked to a motor or driving mechanism within base 31 that moves movable device 30 along tracks 44A, 44B. In accordance with a particular embodiment of the invention, the position of movable device 30 can be determined by fixed sensors 20B, which are mounted at fixed locations within the data center, e.g., as illustrated along the top of rack cabinet 10. For the above purpose, fixed sensors 20B include a sensor type that can determine when movable devcie 30 is proximate, e.g., an optical sensor, and movable device 30 may have an element 46 attached that can be detected by fixed sensors 20B, e.g., element 46 may be a permanent magnet and sensors 20B may include magnetic field sensors. If a device in accordance with an embodiment of the invention is self-guiding in that it contains the processing needed to detect and move the device to the region of an event without requiring external stimulus, then the location of the event can be determined by the location of the device or devices, which is particularly useful if the devices are self-propelled single sensor devices.

Figure 4:
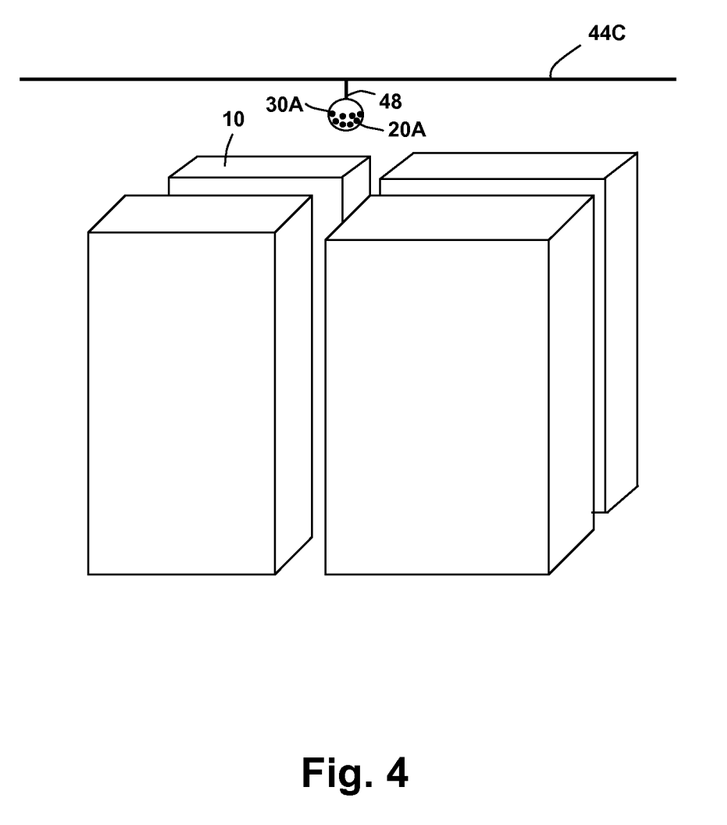
FIG. 4 is a pictorial diagram showing details of a system in accordance with another embodiment of the present invention.

Referring now to FIG. 4, a system in accordance with another embodiment of the invention is illustrated. In the depicted embodiment, movable sensors 20A are disposed on the surface of a spherical device 30A and have directivity and/or enough displacement such that different ones of different movable sensors 20A detect environmental characteristics at different locations or along different angles. A tether or rigid mounting element 42 suspends device 30A from a ceiling track 44C along which the device is moved to make measurements and in response to detected events. A two-dimensional ceiling track can be provided in a manner similar to the system depicted in FIG. 3, or a device 30C can be provided for each aisle. Tether or rigid mounting element 42 may be a pulley and cable arrangement that can raise and lower spherical device 30A to provide further detailed environmental distribution information in the vertical dimension.

Figure 5:
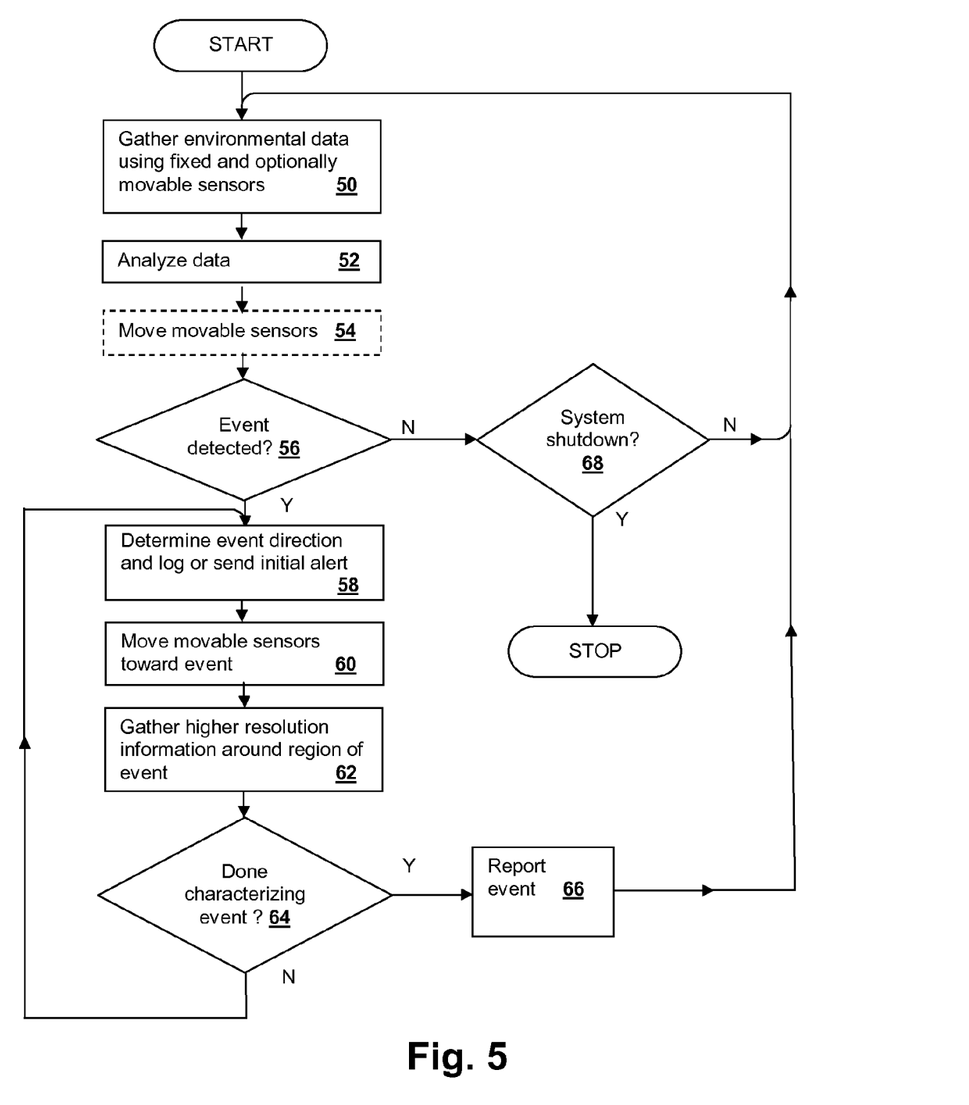
FIG. 5 is a flowchart illustrating a method according to an embodiment of the present invention.

Referring now to FIG. 5, a method in accordance with an embodiment of the present invention is depicted in a flowchart. Environmental data is gathered using fixed and optionally movable sensors (step 50). Alternatively, all initial measurement could be performed using just one set of movable sensors and the measurement data is analyzed (step 52). Then, the movable sensors are optionally moved (step 54) until an event is detected (decision 56), and as long as the system is maintained in an operating state (decision 68), steps 50-56 are repeated. When an event is detected, the event direction is determined from the measurement data and any initial alert is sent (step 58), and the movable sensors are moved toward the region associated with the event (step 60). Higher resolution information is then gathered in that region with the concentration of movable sensors in the region (step 62). Until the event is sufficiently characterized (decision 64), steps 58-64 are repeated. Once the characterization of the event is complete (decision 64), the event is reported 66, which may generate a log entry or may result in an alarm with immediate notification and the system taking action to reduce damage or prevent injury. Processing can then resume at step 50.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system for evaluating an environmental event in a data center, the system comprising:
   multiple movable sensors for measuring an environmental parameter associated with the environmental event;
   a measurement system for receiving outputs of the multiple movable sensors and generating measurement values of the environmental parameter, wherein the measurement system detects the environmental event from the measurement values;
   a controller for moving the multiple movable sensors in response to the measurement system detecting the environmental event to increase a spatial resolution of the measurement values in a region of the data center associated with the event; and
   a movable device to which one or more of the multiple movable sensors is affixed, wherein the movable device is controlled by the controller to move the movable device proximate to the region of the data center to increase the spatial resolution of the measurement values, wherein the movable device is movable along at least one aisle of the data center and has a plurality of the multiple movable sensors distributed along a movable boom extending in first axis, wherein the movable boom is movable along a second axis perpendicular to the first axis, wherein the controller further moves the movable boom in the second axis, whereby the measurement system receives a first distribution of the measurement values along the first axis from the plurality of the multiple movable sensors and determines a second distribution of the measurement values along the second axis as the controller moves the movable boom.

2. The system of claim 1, further comprising a plurality of fixed sensors having fixed locations within the data center, and wherein the controller determines the position of the movable device from an output of at least one of the plurality of fixed sensors indicating proximity of the movable device to the at least one fixed sensor.

3. The system of claim 1, wherein the movable device receives power from a track disposed along the at least one aisle of the data center.

4. The system of claim 1, wherein the movable device increases the spatial resolution by movement of the movable device toward the region of the data center and providing a higher rate of measurement of the environmental values from the one or more of the multiple movable sensors affixed to the movable device to the measurement system.

5. The system of claim 1, wherein the movable sensors communicate wirelessly with the measurement system.

6. The system of claim 5, wherein the movable device is movable along an arbitrary trajectory, whereby the movable device follows the event by being directed to the region by the controller.

7. The system of claim 1, wherein the multiple movable sensors include thermal sensors, and wherein the event is a thermal anomaly caused by a thermal leak between a hot aisle and a cold aisle of the data center.

8. The system of claim 1, wherein the multiple movable sensors include sensors for detecting improper air pressure or composition within the data center.

9. A method of evaluating an environmental event in a data center, the method comprising:
   first moving multiple movable sensors for measuring an environmental parameter associated with the environmental event, wherein the multiple movable sensors are affixed to a movable device that is movable along at least one aisle of the data center and has a plurality of the multiple movable sensors distributed along a movable boom extending along a first axis;
   receiving outputs of the multiple movable sensors and generating measurement values of the environmental parameter;
   detecting the environmental event from the measurement values; and
   second moving the multiple movable sensors in response to the measurement system detecting the environmental event to increase a spatial resolution of the measurement values in a region of the data center associated with the event, wherein the second moving comprises moving the movable device proximate to the region of the data center to increase the spatial resolution of the measurement values and further moving the movable boom along a second axis perpendicular to the first axis, whereby the measuring receives a first distribution of the measurement values along the first axis from the plurality of the multiple movable sensors and determines a second distribution of the measurement values as the controller moves the movable boom in the second axis.

10. The method of claim 9, wherein the measurement further receives output from a plurality of fixed sensors having fixed locations within the data center, and further comprising determining the position of the movable device from an output of at least one of the plurality of fixed sensors indicating proximity of the movable device to the at least one fixed sensor.

11. The method of claim 9, further comprising receiving power at the movable device from a track disposed along the at least one aisle of the data center.

12. The method of claim 9, wherein the second moving increases the spatial resolution by moving the movable device toward the region of the data center and providing a higher rate of measurement of the environmental values from the one or more of the multiple movable sensors affixed to the movable device to the measuring.

13. The method of claim 9, wherein the movable sensors communicate wirelessly with the measurement system.

14. The method of claim 13, wherein the second moving moves the movable device along an arbitrary trajectory, whereby the movable device follows the event by being directed to the region by moving.

15. The method of claim 9, wherein the multiple movable sensors include thermal sensors, and wherein the event is a thermal anomaly caused by a thermal leak between a hot aisle and a cold aisle of the data center.

16. The method of claim 9, wherein the multiple movable sensors include sensors for detecting improper air pressure or composition within the data center.

17. A data center having an ability to automatically detect an internal environmental event, the data center comprising:
    multiple equipment racks disposed along multiple aisles;
    a movable device having multiple environmental sensors affixed thereto for measuring an environmental parameter associated with the internal environmental event;
    a measurement system for receiving outputs of the multiple environmental sensors and generating measurement values of the environmental parameter, wherein the measurement system detects the environmental event from the measurement values; and
    a controller for moving the movable device along at least one of the multiple aisles in response to the measurement system detecting the environmental event to increase a spatial resolution of the measurement values in a region of the data center associated with the event, wherein the movable device is controlled by the controller to move the movable device proximate to the region of the data center to increase the spatial resolution of the measurement values, wherein the movable device is movable along at least one aisle of the data center and has a plurality of the multiple environmental sensors distributed along a movable boom extending in first axis, wherein the movable boom is movable along a second axis perpendicular to the first axis, wherein the controller further moves the movable boom in the second axis, whereby the measurement system receives a first distribution of the measurement values along the first axis from the plurality of the multiple movable sensors and determines a second distribution of the measurement values along the second axis as the controller moves the movable boom.

18. The data center of claim 17, wherein the aisles alternate between hot aisles and cold aisles and wherein the event is a thermal leak between a hot aisle and a cold aisle.

19. The data center of claim 17, wherein the controller moves the movable device along multiple aisles and wherein at least one of the aisles is perpendicular to another one of the multiple aisles.

* * * * *